W. B. HAUSMAN.
MOVING PICTURE MACHINE.
APPLICATION FILED AUG. 2, 1909.

1,041,784.

Patented Oct. 22, 1912.

4 SHEETS—SHEET 2.

WITNESSES
S. M. Gallagher
Chester Riland

INVENTOR
Ward B. Hausman
BY
ATTORNEY

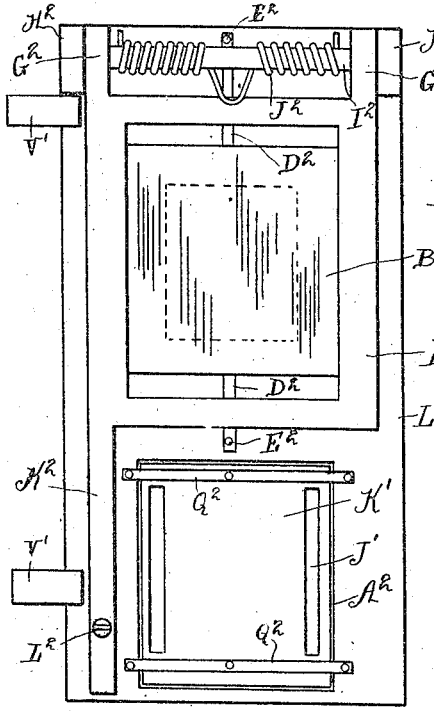
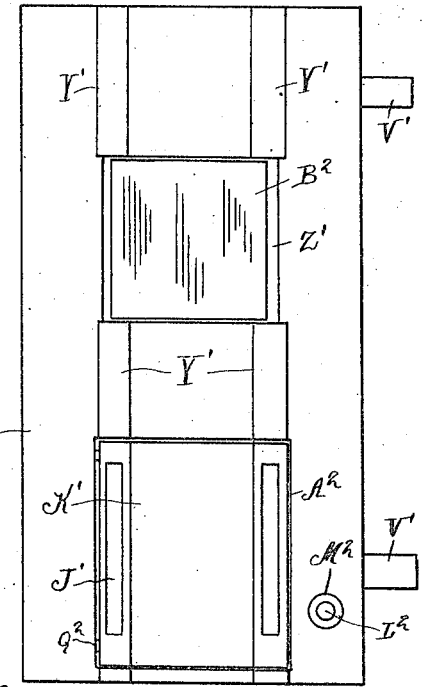
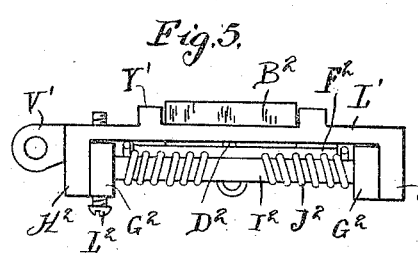
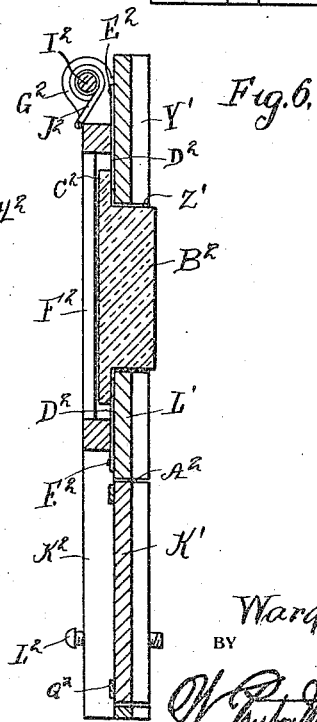

W. B. HAUSMAN.
MOVING PICTURE MACHINE.
APPLICATION FILED AUG. 2, 1909.
1,041,784.
Patented Oct. 22, 1912.
4 SHEETS—SHEET 4.
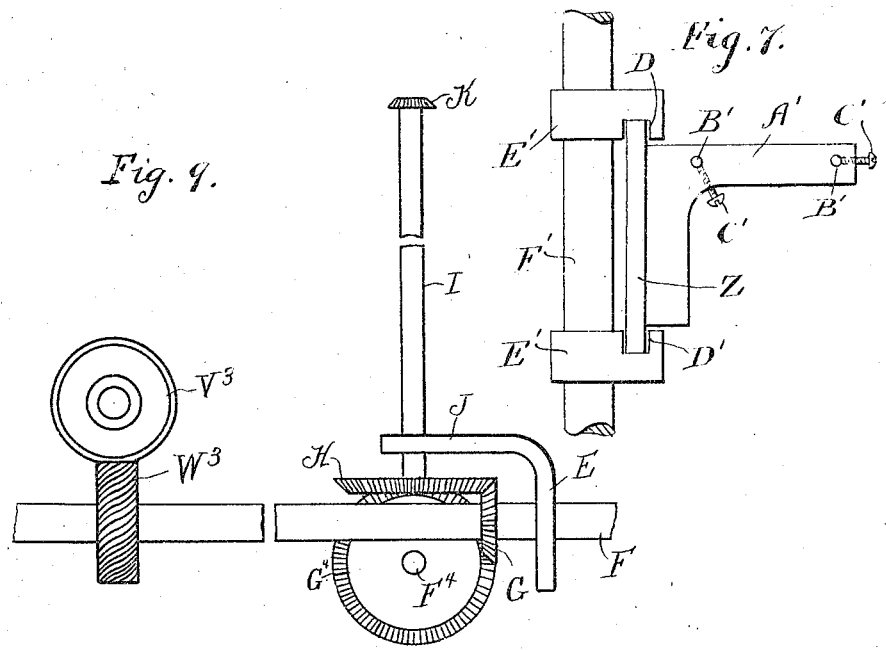
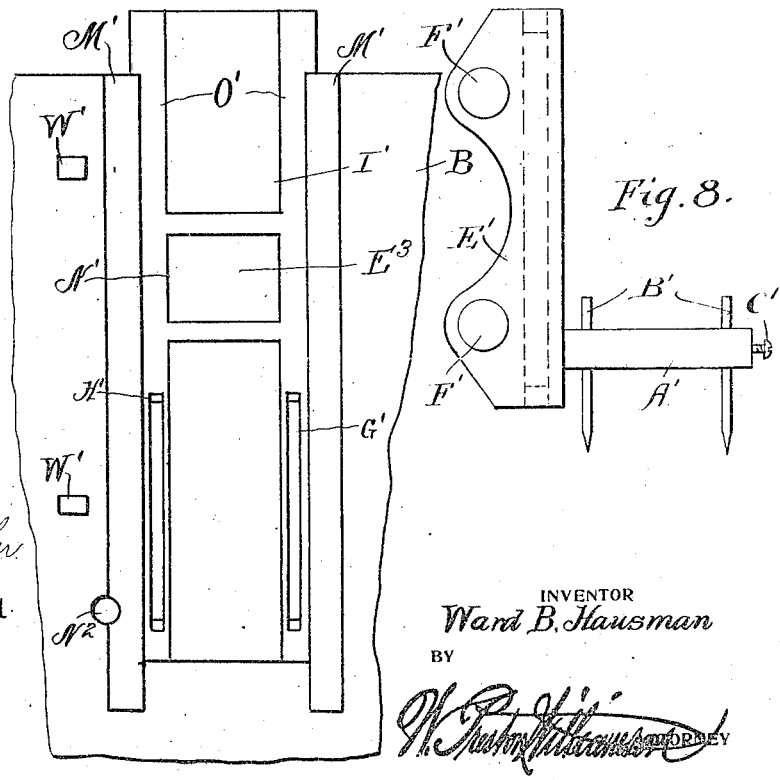
WITNESSES
INVENTOR
Ward B. Hausman

UNITED STATES PATENT OFFICE.

WARD B. HAUSMAN, OF PHILADELPHIA, PENNSYLVANIA.

MOVING-PICTURE MACHINE.

1,041,784.  Specification of Letters Patent.  Patented Oct. 22, 1912.

Application filed August 2, 1909. Serial No. 510,863.

*To all whom it may concern:*

Be it known that I, WARD B. HAUSMAN, a citizen of the United States, residing at Philadelphia, in the county of Philadelphia and State of Pennsylvania, have invented a certain new and useful Improvement in Moving-Picture Machines, of which the following is a specification.

My invention relates to a new and useful improvement in moving picture machines, and has for its object to provide an exceedingly simple and effective device of this character whereby with the change of a number of parts it may be used for taking pictures, printing them and reproducing them upon a sheet.

Another object of the invention is to provide a device of the character described which will be less expensive than the ordinary machine to manufacture, will be small, compact, strong and durable.

Another object of the invention is to produce a new and exceedingly simple arrangement for imparting an intermittent motion to the film.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
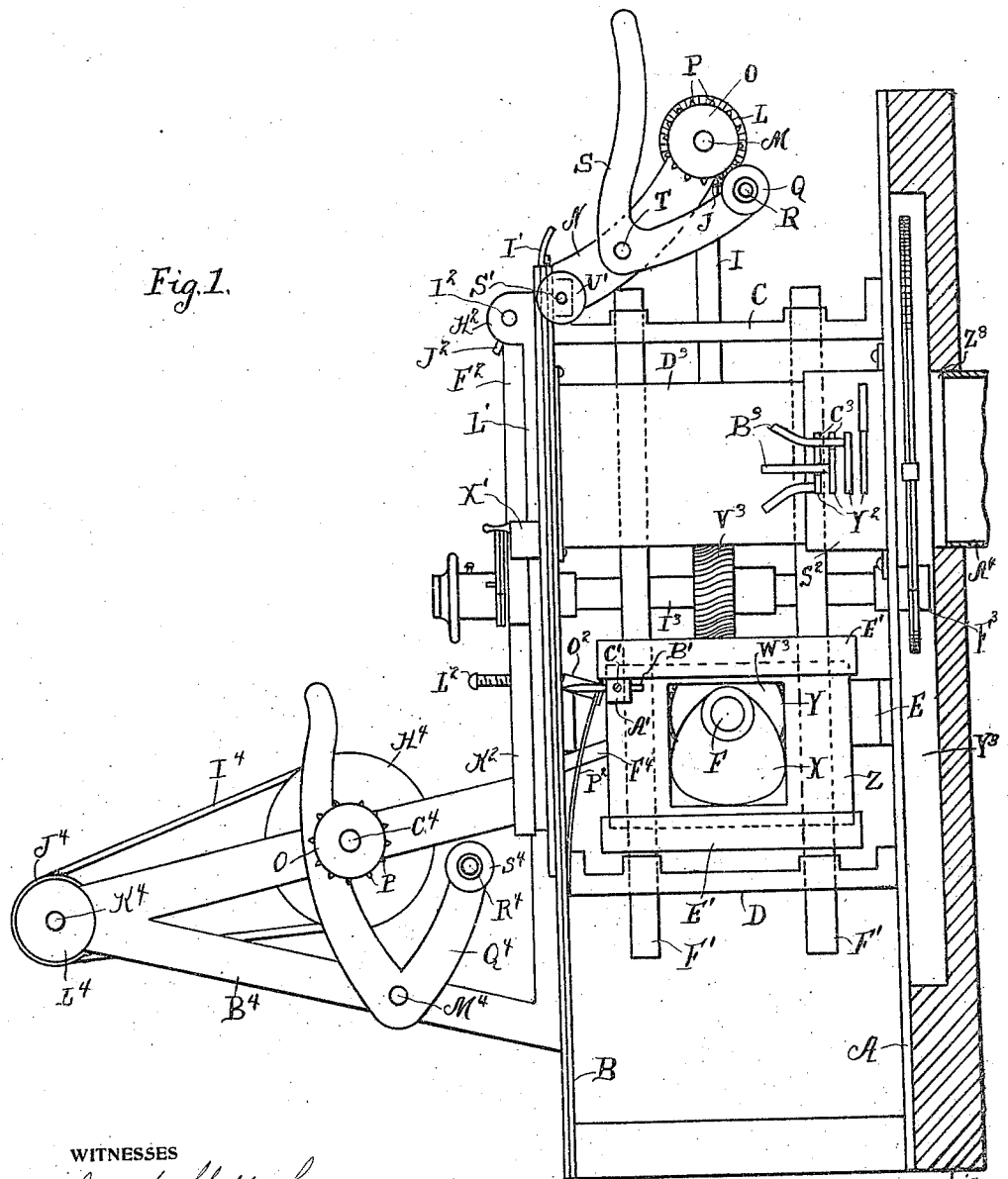
Figure 2:
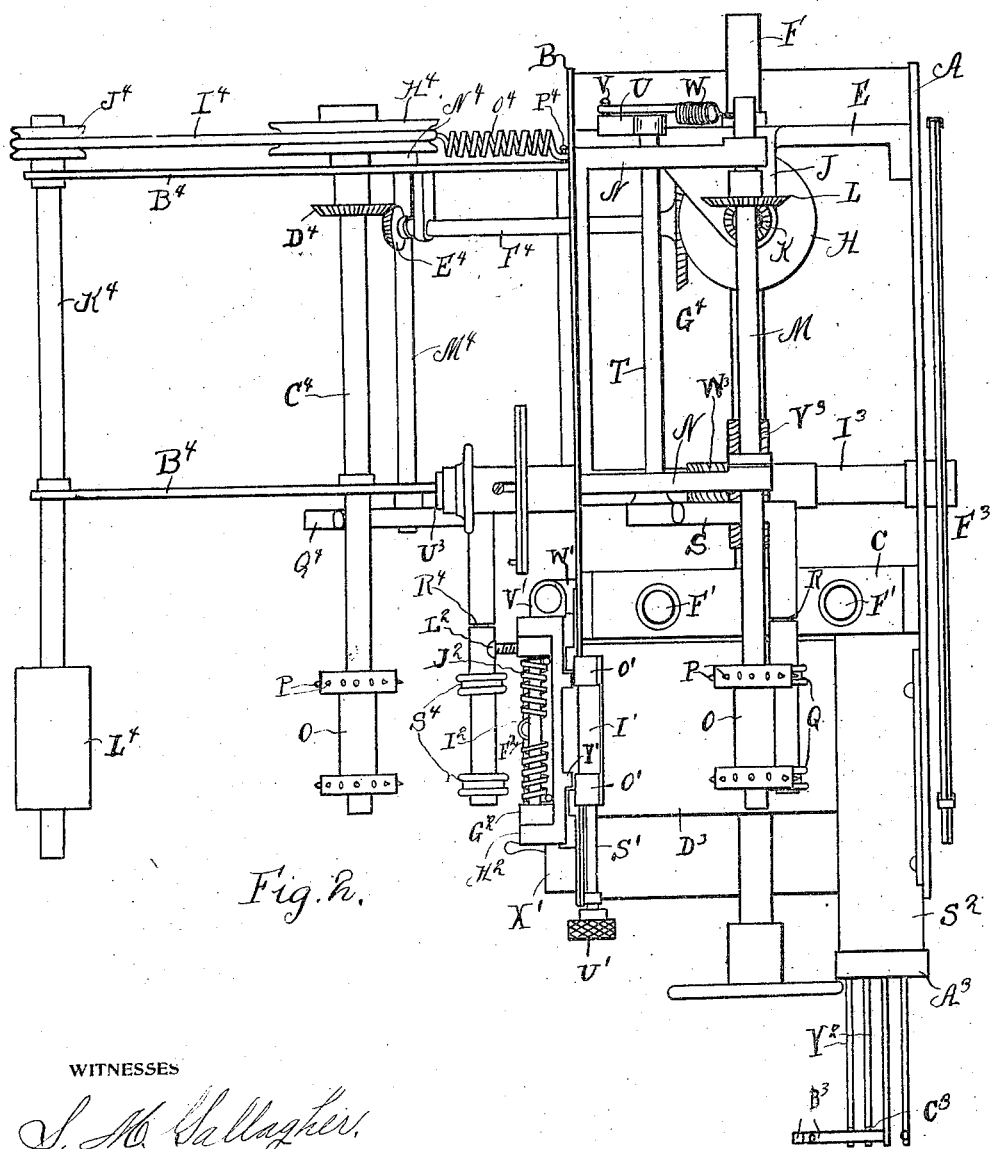

Figure 1 is a side elevation of the device having the hand wheel removed from the main shaft and showing the plate covering the shutter in section. Fig. 2, a plan view thereof showing the hand wheel in position and the plate covering the shutter removed. Fig. 3, an enlarged front elevation of the door. Fig. 4, a back view thereof. Fig. 5, a top edge view thereof. Fig. 6, a vertical sectional view thereof. Fig. 7, an edge view of the device for imparting intermittent motion to the film. Fig. 8, a plan view thereof.
Fig. 9, a diagrammatical view of a portion of the gearing, and Fig. 10, an elevation of a portion of the machine, the door being removed to more clearly show the construction of the slide for centering the pictures.
In carrying out my invention as here embodied, A represents the front wall and B the rear wall of the device, which may be of any suitable material, but preferably of sheet metal, and these are fastened together by the braces C, D and E, which also act as bearings for parts of the machine to be hereinafter described.

Journaled in the brace E is the main shaft F, which may be driven in any suitable and well known manner. On this shaft is mounted the bevel pinion G which meshes with the bevel gear H mounted on the lower end of the shaft I, said shaft being journaled in the arm J of the brace E. On the upper end of the shaft I is mounted a bevel pinion K which meshes with the bevel gear L mounted on the shaft M, which is journaled in the brackets N secured in proximity to the upper end of the rear wall B. On the opposite end of the shaft M is mounted the upper spool O having the teeth P which engage with the perforations in the film, and in order that the film may be held in engagement with these pins, I provide the grooved pulleys Q mounted on the shaft R carried by the lever S, which is secured to the shaft T mounted in the brackets N, so that by moving the lever S the grooved pulleys Q may be moved to or away from the spool O. On the opposite end of the shaft T I mount a projection U, having a pin or its equivalent V placed in the free end thereof, to which is attached one end of the spring W, the opposite end thereof being attached to the brackets N. This spring W will hold the grooved pulleys Q either against or away from the spool O. Also mounted on the main shaft F is a cam X which acts on the side walls of the opening Y formed in the cam plate Z, said cam plate carrying the arm A', in which are adjustably mounted the pins B', the adjustment being secured by the screws C' which pass into the arm and rest against the pins. The cam plate Z slides horizontally in the tracks D' formed in the frame members E', which are securely fastened to the vertical rods F' slidably mounted in the braces C and D.

From the foregoing description it will be seen that with each revolution of the main shaft F the cam will move the pins B' outward because of the sliding of the cam plate Z, then downward as the cam draws the rods F' downward, then inward and upward. This produces the intermittent movement to the film after the pins are inserted in the perforations in said film, then in their downward movement draw the film downward, they are then withdrawn from the perforations and moved upward and outward for their next engagement with the perforations. The pins B' as they move outward pass through the slots G' in the rear plate B of the device and through the slots H' in the slidable centering device I' and also through the slots J' in the spring actuated member K', which is attached to the door L'.

M' are projections which with the rear plate B form tracks in which slides the centering member I', having an opening N' through which the light may pass, and having flanges O' on which rests the film when running through the machine. Said centering device I' is adjusted through suitable mechanism operated by the revolving shaft S' which carries a thumb wheel U' for this purpose. When the film is placed in the machine its upper and lower edge may register with the opening N', or it may not, and if not it will be impossible to see all of the picture, but by raising or lowering the centering device I' the opening N' will be brought to such position that the rays of light will pass through the parts of the picture.

The door L' having the hinge members V' is attached to the hinge members W' mounted on the rear plate B. This door is held in its closed position by the latch X'. On the inner face of the door L' are formed the ridges Y' which when the door is closed will be parallel with the flanges O' on the centering member I'. In this door are formed the openings Z' and $A^2$, one of which is directly above the other. In the opening Z' is placed a ground glass $B^2$ which has a flange $C^2$ formed therewith adapted to rest against the front face of the door, and between this flange and the door are placed the flat springs $D^2$, one end of each being secured to the door, as at $E^2$, the tendency of these springs $D^2$ is to force the glass $B^2$ outward, and in order that it may be held inward until a predetermined time, I provide a frame $F^2$ which rests against the outer surface of the flange $C^2$ and this frame has lugs $G^2$ formed with the upper portion thereof which rests between the lugs $H^2$ formed with the upper end of the door and through which passes the pin $I^2$, having a spring $J^2$ coiled about the same, a portion of which rests against the frame $F^2$ and another portion against the door, thus normally holding said frame to the door.

With the lower portion of the frame is formed a depending arm $K^2$ through which is threaded a screw $L^2$, said screw being of sufficient length to pass through the opening $M^2$ in the door and the opening $N^2$ in the plate B, the inner end of this screw rests in proximity to the releasing pin $O^2$, which is secured to the free end of the spring $P^2$, said spring being fastened to the plate B. As the cam plate Z moves toward the rear plate B it will come in contact with the releasing pin $O^2$ causing it to move outward until it comes in contact with the screw $L^2$, at which time it will move said screw outward, and as this is threaded into the arm $K^2$ of the frame $F^2$, said frame will move outward, at which time the springs $D^2$ will move the glass $B^2$ outward releasing the pressure upon the film.

In the opening $A^2$ is placed the spring actuated member K', and this is held in the opening in any suitable manner, but here shown as being attached to the springs $Q^2$, the ends of which are fastened to the door. When the pins B' pass into the perforations in the film, said film will go or move away from said pins until they are fully inserted, at which time the springs $Q^2$ will cause the spring actuated member K' to move back to place, returning the film to its proper position.

In the front plate A, is formed an opening, and against the back of this plate is secured a housing $S^2$ through which light passes. In said housing $S^2$ may be fitted suitable slides having the projecting arms $Y^2$ which pass through the cover $A^3$ and to a number of these arms are secured the knobs $B^3$ the one nearer the front of the machine resting in the notches $C^3$ formed in the ends of the other arms, and the knob in the next arm resting in the notch formed in the rear arm, so that by taking hold of the knob on the arm farthest front and moving it inward, it resting against the other arms, will cause them to move inward and when they are in their innermost position, by taking hold of the knob on the rear arm, they will all be caused to move outward. To the rear of the housing $S^2$ is secured the casing $D^3$ through which passes the light to the opening $E^3$ in the rear plate B which is shown in Fig. 10.

In order that the light may be admitted to the different openings at the correct time, I provide a shutter $F^3$ mounted on the shaft $I^3$ which passes through the machine and is held rotatably therein. On the shaft $I^3$ is mounted a worm gear $V^3$ which meshes with the worm gear $W^3$ mounted on the main shaft F, thus as the main shaft is revolved the shutter $F^3$ will be revolved for shutting off and admitting light to the proper openings. On the front face front wall is mounted the shutter covering $X^3$ having formed therein the chamber $Y^3$ in which the shutter works, said shutter covering also having an opening $Z^3$ therein. In this opening is shown a light shield $A^4$ but instead of this light shield, a lens may be mounted therein for either taking or projecting the pictures.

$B^4$ represents rearwardly projecting brackets, in which is mounted the shaft C⁴ carrying the lower film spool O. On this shaft is also mounted the bevel gear D⁴ meshing with the bevel pinion E⁴ mounted on the shaft F⁴ carrying the bevel gear G⁴ which meshes with the gear H. In this way motion is given to the film spool O mounted on the shaft C⁴.

H⁴ denotes a grooved wheel also mounted on the shaft C⁴ over which runs the belt I⁴ which also runs over the grooved pulley J⁴ mounted on the shaft K⁴, on which is mounted the winder L⁴ adapted to receive the film after being exposed or exhibited.

M⁴ is a shaft similar to the shaft T, carrying a projection N⁴, to which is attached one end of the spring O⁴, the opposite end being secured to a screw P⁴ mounted on the brackets B⁴. On the opposite end of the shaft M⁴ is mounted a lever Q⁴ carrying a shaft R⁴, on which is journaled the grooved pulleys S⁴.

In practice the complete device will be placed in a light tight casing so that no light will come in contact with the films except that which passes through suitable openings and only at the time when the shutter is not covering said openings.

The operation of the device is as follows:—The main shaft F is revolved in some suitable manner, which through the medium of the gearing will cause the spools O carrying the film to revolve, at the same time causing the pins B′ through the medium of the cam S and adjacent members to enter the perforations of the film, pull it down and then let go, at which time the spring actuated member K′ and the glass B² will come in contact with the film and hold it steady, and when this film is standing still the shutter F³ will open the opening R² allowing the light to pass through the openings T² in the housing S² through the casing D³ and the openings E³ and N′ to the film. This operation will either print or take pictures.

In taking the pictures, a lens is placed in the opening Z³ and a film run from the film spools between the door and back plate. In this case light has been entering from the front of the machine, but to reproduce the pictures upon a sheet, the light is placed at the back of the machine and the film allowed to run the same as it would at other times.

Of course I do not wish to be limited to the exact details of construction here shown as these may be varied within the limits of the appended claims without departing from the spirit of my invention.

Having thus fully described my invention, what I claim as new and useful, is—

1. In combination with a moving picture machine, vertical rods slidably mounted in suitable bearings, frame members having grooves therein secured to the vertical rods, a cam plate having a central squared opening slidable in the grooves, an arm carried by said cam plate, pins adjustably mounted therein, and a cam mounted in the opening in the cam plate, as specified.

2. In combination with a moving picture machine, a main shaft, vertical rods mounted in suitable bearings, frame members having grooves therein secured to said vertical rods, a cam plate having a squared central opening slidably mounted in said grooves, a cam mounted on the main shaft adapted to operate against the side walls of the opening in the cam plate for moving said cam plate sidewise, and the frame members up and down, and an arm carrying adjustable pins mounted on said cam plate.

3. In combination with a moving picture machine, a main shaft, vertical rods mounted in suitable bearings, frame members having grooves therein secured to said vertical rods, a cam plate having a squared central opening slidably mounted in said grooves, a cam mounted on the main shaft adapted to operate against the side walls of the opening in the cam plate for moving said cam plate horizontally and the frame members vertically, an arm mounted on the cam plate and extending at right angles thereto, pins adjustably mounted on said arm, and screws for holding said pins in their adjustment.

4. In combination with a moving picture machine, vertical rods slidably mounted in suitable bearings, frame members having grooves therein secured to the vertical rods, a cam plate having a central squared opening slidable in the grooves, means carried by said cam plate for intermittently engaging the film, and a cam mounted in the opening in the cam plate, as specified.

5. In combination with a moving picture machine, vertical rods slidably mounted in suitable bearings, frame members secured to said rods, a cam plate having a central squared opening slidably mounted between said frame members, means carried by said cam plate for intermittently engaging a film, and a cam mounted in the opening in the cam plate for operating the same.

6. In combination with a moving picture machine, vertical rods slidably mounted in suitable bearings, frame members secured to said rods, a cam plate having a central squared opening slidably mounted between said frame members, an arm carried by said cam plate, pins mounted thereon for engagement with a film, and a cam mounted in the opening in the cam plate for operating the same.

7. In combination with a moving picture machine, vertical rods slidably mounted in suitable bearings, frame members secured to said rods, a cam plate having a central squared opening slidably mounted between said frame members, an arm carried by said plate, pins, means for adjustably securing said pins to the arm, and a cam operatively mounted in the opening in the cam plate, for the purpose set forth.

8. In combination with a moving picture machine, vertical rods slidably mounted in suitable bearings, frame members secured to said rods, a cam plate having an opening therein, said cam plate operatively mounted between the frame members, an arm carried by said cam plate, pins adjustably mounted thereon, and a cam operatively mounted in the opening in the cam plate.

9. In combination with a moving picture machine having suitable bearings and provided with a main shaft, vertical rods mounted in said bearings, frame members secured to said rods, a cam plate carrying means for intermittent engagement with a film, said cam plate being slidably mounted between the frame members, and a cam mounted upon the main shaft and in operative relation to the cam plate, as shown, and for the purpose set forth.

In testimony whereof, I have hereunto affixed my signature in the presence of two subscribing witnesses.

WARD B. HAUSMAN.

Witnesses:
EDW. W. ANSTICE,
S. M. GALLAGHER.